Dec. 6, 1949 — L. S. WILLIAMS — 2,490,723
STABILIZING MEANS FOR WEIGHING SCALES
Filed June 25, 1947 — 2 Sheets-Sheet 2
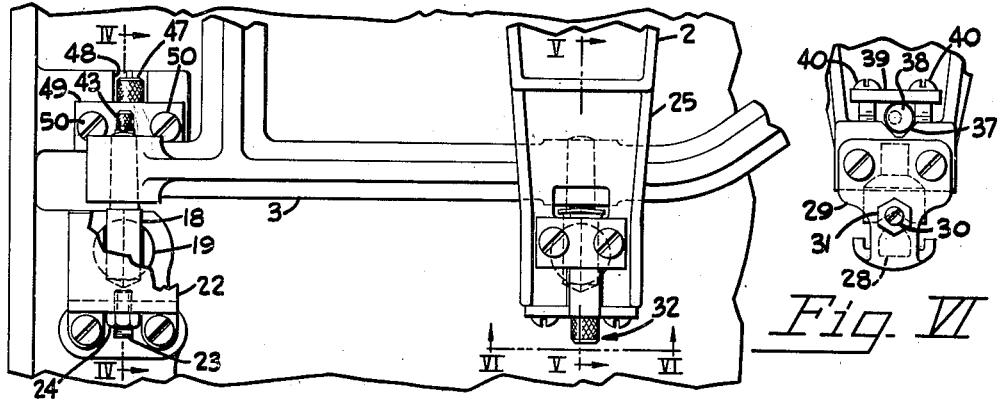
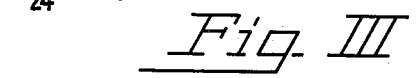
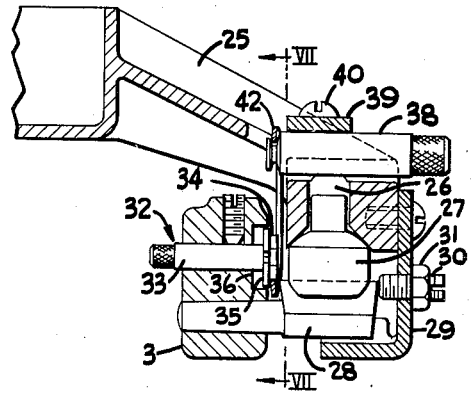
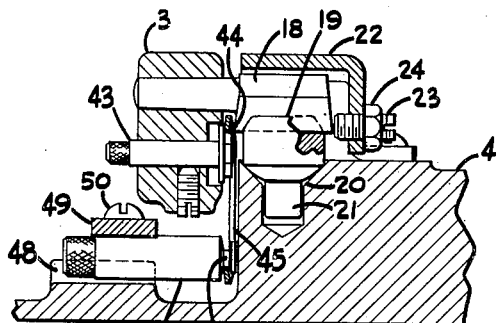
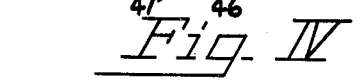
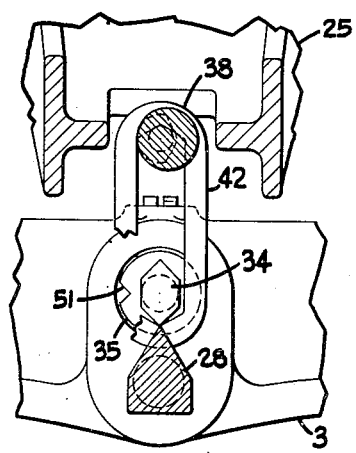
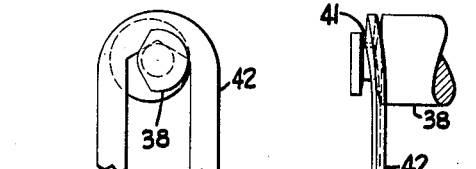
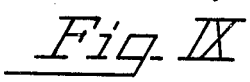
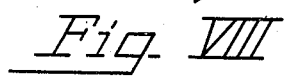
INVENTOR.
Lawrence S. Williams
BY
Marshall and Marshall
ATTORNEYS Patented Dec. 6, 1949

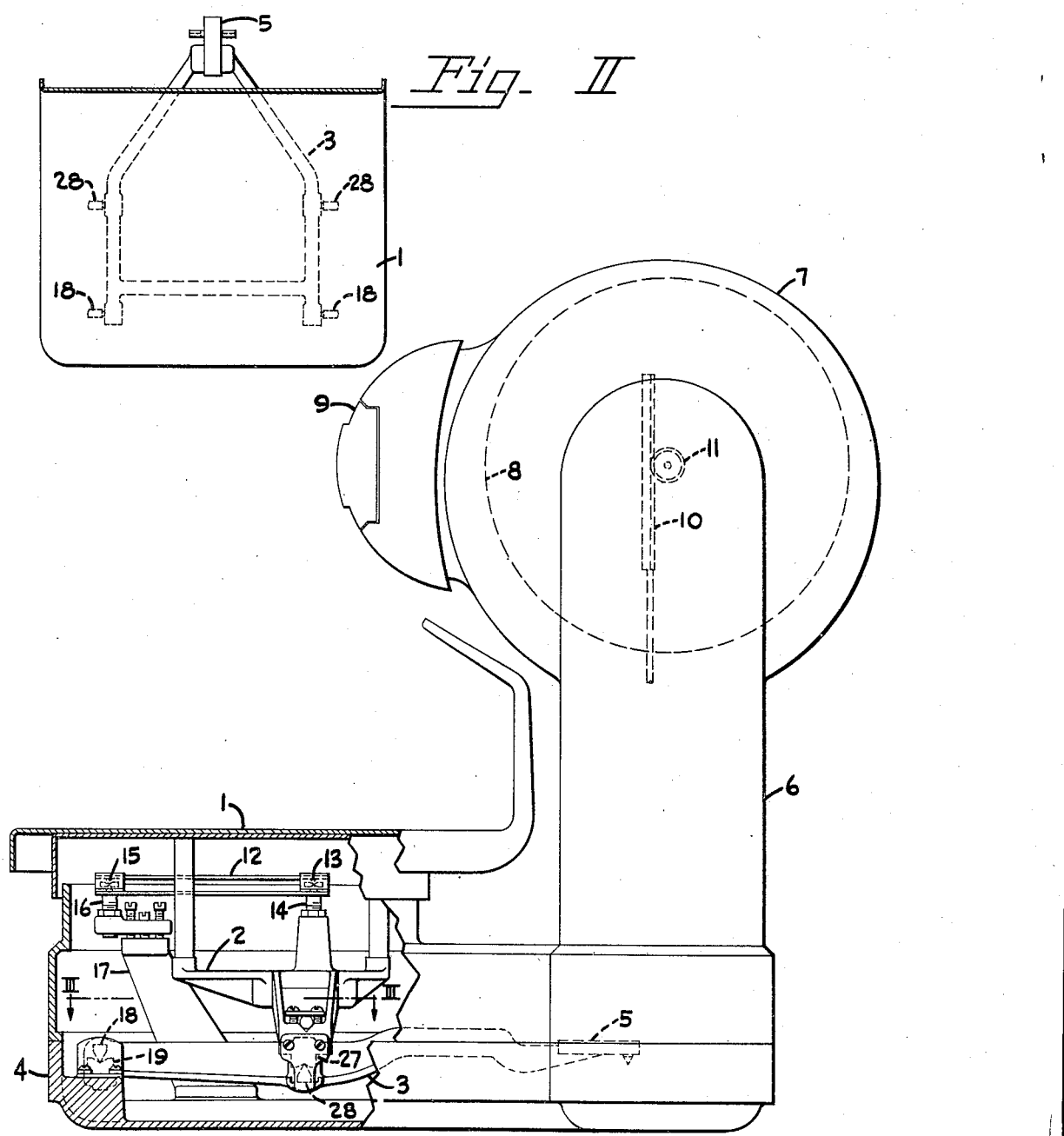

2,490,723

UNITED STATES PATENT OFFICE 2,490,723

STABILIZING MEANS FOR WEIGHING SCALES

Lawrence S. Williams, Toledo, Ohio, assignor to Toledo Scale Company, Toledo, Ohio, a corporation of New Jersey Application June 25, 1947, Serial No. 756,919

6 Claims. (Cl. 308—2)

This invention relates to weighing scales, and in particular to means for preventing derangement of the weighing mechanism when heavy loads are applied near an edge of a load receiver.

Weighing scales, particularly those intended for use in retail food stores, are commonly constructed with a single A-shaped lever that serves to support the load receiver and transmit load forces to an automatic load counterbalancing mechanism. The load receiver is maintained in upright operative position by a check link. As long as the resultant of the load forces acts near the center of the load receiver, no stability problems are introduced. If, however, the load is applied near the edge of the load receiver there is a tendency to rock the load receiver and lift one of its bearings from the cooperating knife edge pivot of the lever. Unless this lifting of the bearing from the pivot is prevented the load receiver will tip to such an extent that the scale becomes inoperative. Various devices have been proposed to prevent such derangement of the weighing mechanism but they have either been too costly or have introduced too much friction into the weighing mechanism.

The principal object of this invention is to provide a simple, economical mechanism for stabilizing a weighing scale against the possibility of derangement resulting from loads applied near the edge of the load receiver.

Another object of the invention is to provide a stabilizing means, the parts of which do not carry load except when required to prevent the lifting of a bearing from the cooperating pivot.

A still further object is to provide a stabilizing means that is simple to adjust and which is not liable to get out of adjustment during use.

These and other objects and advantages are apparent from the following description in which reference is made to the accompanying drawings.

The invention consists in stabilizing mechanism for a weighing scale pivotal connection, comprising, means in a first member for defining a pivoting axis capable of receiving force from various directions, and mechanism in a second member cooperating with said means for transmitting force to the said means regardless of the direction of the force.

In the preferred form the stabilizing means is used with a pivotal connection in which a knife edge pivot in a first part cooperates with a V-bearing in a second part and comprises a first member mounted in the first part and having a knife edge substantially aligned with the pivot and directed oppositely to the pivot, a second member carried in the second part, and a link engaging said members for preventing separation of said parts.

The improved stabilizing means provides substantially frictionless resistance against separation of the parts of the weighing scale because the knife edge in the first member may rock against the end of the link and because no stress is set up in the link other than the force actually required to prevent the bearing from leaving the knife edge.

The improved construction also allows the knife edge of the stabilizing means to be accurately aligned with the load carrying knife edge of the lever. This feature is important in that it permits the stabilizing means to be adjusted with minimum clearance and yet maintain that clearance throughout the normal operation of the scale.

The preferred form of the invention is illustrated in the accompanying drawings.

In the drawings:

Figure I is a side elevation with parts broken away of a weighing scale embodying the improved stabilizing means.

Figure II is a fragmentary plan view showing the space relationship between the load receiver and the lever of the scale.

Figure III is a fragmentary plan view as seen from the line III—III of Figure I.

Figure IV is a vertical section taken substantially along the line IV—IV of Figure III, to show a fulcrum pivot of the lever.

Figure V is a vertical section taken along the line V—V of Figure III to show a load pivot connection.

Figure VI is a fragmentary side elevation of the load pivot as seen from the line VI—VI of Figure III.

Figure VII is an enlarged fragmentary section taken along the line VII—VII of Figure V.

Figure VIII is a detail view showing the cooperation between the various members of the stabilizing means.

Figure IX is a detail view of the connection between the stabilizing link and one of the members with which it cooperates.

These specific figures and the accompanying description are intended merely to illustrate the invention but not to impose limitations on the claims.

A typical weighing scale in which the improved stabilizing means may be employed has a load receiver 1 secured to a spider 2 which is pivotally supported from a lever 3. The lever 3, in plan, is substantially triangular in form and is fulcrumed at the front corners of a base 4 and has its power pivot end 5, the apex of the triangular shape, located beneath a generally rectangular column 6 erected from the rear of the base 4. A generally cylindrical housing 7 surmounting the rectangular column 6 encloses a rotatable indicia-bearing chart 8 that is viewed through magnitfying lenses mounted in a forwardly extending portion 9 of the housing 7. Load counterbalancing mechanism employing either springs or pendulums is enclosed within the rectangular column 6 and is operatively connected through a rack 10 to a pinion 11 that is mounted on the shaft of the indicia-bearing chart 8. The load counterbalancing mechanism rotates the chart 8 through angles that are proportional to the load forces transmitted from the load receiver 1 through the lever 3 to the counterbalancing mechanism.

The spider 2 is prevented from rocking about its pivotal connection to the lever 3 by a check link 12 that is pivotally connected through opposed knife edges and pivots 13 to the upper end of a post 14 extending upwardly from the central portion of the spider 2. The other end of the check link 12 is pivotally connected through knife edge pivots and bearings 15 to a post 16 that is adjustably mounted from a pedestal 17 erected from the base 4. The adjustment of the mounting of the post 16 from the pedestal 17 permits the line of action of the check link 12 to be adjusted until it is precisely parallel to the pivot line of the lever 3.

Referring to Figures II, III and IV, the lever 3 is provided with tenon-shaped fulcrum pivots 18 that extend laterally from the wide end of the lever 3. The fulcrum pivots 18 are pivotally supported in V-bearings 19 that are mounted in the corners of the base 4. The V-bearings 19 are made self-aligning by forming a portion of their surface to the contour of a sphere the center of which lies in the center of the V-groove in the bearing. The speherical portion of the V-bearing 19 rests in the conical portion of a drilled and countersunk hole 20 cut in the base 4. A cylindrical shank 21 formed integrally with the V-bearing 19 is loosely engaged in the drilled portion of the hole 20 to limit the freedom of movement of the V-bearing 19. A cap 22 is secured to the surface of the base 4 adjacent the bearing 19 and shields the knife edge 18 and bearing 19 from any dust or dirt that may find its way into the interior of the scale housing. A hardened screw 23 that is threaded through a portion of the cap 22 in alignment with the sharp edge of the pivot 18 serves as a thrust bearing to position the knife egde 18 with respect to the bearing 19. The screw 23 is held in adjusted position by a lock nut 24 threaded on the screw 23.

Referring to Figures III, V and VI, an arm 25 extending laterally from the spider 2 has a drilled and countersunk hole 26 that receives a spherical seat V-groove bearing 27. The bearing 27 pivotally rests on a load pivot 28 that extends laterally from the midportion of the lever 3. A cap 29 secured to the end of the arm 25 has a portion that extends downwardly and under the load pivot 28. A screw 30 secured by a lock nut 31 is threaded through the cap 29 in axial alignment with the knife edge of the pivot 28 and serves as a thrust bearing to maintain the bearing 27 in position along the knife edge of the pivot 28.

Referring to Figure II, if loads are placed near the center of the load receiver 1 the force is distributed or divided between the load pivots 28 and since each of the pivots is subjected to a downward force, the bearings 27 will be maintained in operative position on the knife edge pivots 28. If, however, the load is concentrated toward one side or the other of the load receiver so that the resultant of the load forces falls between one of the pivots 28 and the adjacent edge of the load receiver 1 the opposite load pivot is completely relieved of load and that arm of the spider tends to lift until its upward motion is limited by the cap 29. The area of the resulting contact between the cap 29 and the pivot 28 and the distance of that contact from the knife edge of the pivot 28 introduces a serious amount of friction as well as producing actual change in load indication.

To prevent this separation between the knife edge pivot 28 and the bearing 27 resting thereon, a stabilizing means connecting the pivotally connected parts of the scale is employed. This stabilizing means consists of a first member 32 that is mounted in the first part of the weighing scale mechanism—the lever 3. The first member 32 comprises a cylindrical shank portion 33 that is fitted through a hole in the lever 3 and a head portion 34 that provides a pair of pivot edges. The first member is made from square stock by turning the greater portion of its length to form the cylindrical shank portion 33 and then cutting off two corners of the head portion to reduce its width to correspond to the diameter of the shank portion. The two remaining corners of the originally square stock provide the pivot edges for the member. A washer 35 is slipped over the shank portion 33 and is staked against the head portion 34. The lever 3 is provided with a counterbore 36 of sufficient diameter and depth to completely receive the washer 35 and the head portion 34 when it is desired to retract these members from their normal position adjacent the end of the knife edge of the pivot 28.

The upper surface of the end of the spider arm 25 is provided with a V groove 37 that partially receives a short cylindrical rod constituting a second member 38 of the stabilizing mechanism. A short bar 39 secured by a pair of screws 40 serves to clamp the second member in position.

Referring to Figures VIII and IX, one end of the second member 38 is provided with a groove 41 the root circle of which groove is eccentric to the axis of the cylindrical portion of the member 38. A formed link 42 is suspended from the groove 41 with its lower end engaging one of the square corners of the head 34 of the first member 32. The relative cooperation and positioning of the first and second members and the link is clearly shown in Figures VII and VIII. In these figures it will be noticed that one of the square edges that provides the pivoting edge for the head 34 of the first member is positioned in opposition to, in alignment with and adjacent the end of the knife edge portion of the pivot 28. The eccentric groove portion of the second member 38 is positioned vertically above the pivot edge of the head 34. The link 42 is provided with V-bearing surfaces in each of its ends so that it is symmetrical and may be assembled with either end uppermost. The link is further formed by pressing the V-bearing portions out of the plane of the remainder of the link so that the equivalent of thrust points are provided for cooperation with the washer 35 and the end of the pivot 28.

Either of the fulcrum pivots 18 is also liable to be raised out of its cooperating V-bearing 19 in the event that a sufficiently heavy load is applied near the edge of the load receiver 1. This lifting is prevented by a similar stabilizing mechanism comprising a first member 43 that is mounted in the lever 3 and which has at least one pivot edge 44 that is positioned in substantial alignment with and adjacent the end of the knife edge of the fulcrum pivot 18. A link 45 suspended from the pivot edge 44 engages an eccentric groove 46 in a second member 47 that is clamped in a V-groove 48 cut in the base 4. A bar 49 secured by a pair of screws 50 serves to clamp the cylindrical second member 47 in position.

This stabilizing mechanism is very easy to install and adjust inasmuch as the pivot edge of the head 34 may, by visual inspection, be accurately aligned with the load or fulcrum pivot 28 or 18. In order that the first member—the member having the pivot edge—may be installed after the fulcrum and load pivots are ground, a notch 51 is cut in the washer 35 to allow the washer to pass the knife edge of the pivot. It is also possible to install the first member in the lever before the pivots are set, the member being withdrawn into the counterbore during the final grinding of the knife edge pivot. The eccentricity of the groove in the second member permits the clearance or slack between the link and the pivot edge in the first member to be adjusted by merely rotating the second member. Since the amount of adjustment required is slight and the amount of eccentricity is comparatively large, the second member 38 or 47 need not be rotated through a very large angle and, therefore, the V-grooves may be offset from a vertical line through the V-bearings by an amount substantially equal to the eccentricity of the groove so that the links hang vertically.

The combination of this stabilizing mechanism with the pivot and bearing may be considered as a structure having a turning axis, the knife edge of the pivot and the aligned pivot edge of the first member, and means for engaging the upwardly or downwardly directed portion of the structure providing the turning axis according to the direction of the force applied to the pivotally connected parts of the scale. Since the turning axis is positively defined and is substantially the same whether the force be directed upwardly or downwardly a load near the edge of the load receiver that reverses the direction of the force transmitted through the pivotal connection cannot affect the accuracy of the load indication. Whether the link of the stabilizing mechanism is carrying load or not the only relative motion between the parts of the complete pivotal structure is the rocking motion of the pivot edges against the cooperating V-bearings whether the V-bearing in the link or the V-groove bearing cooperating with the knife edge of the pivots 28 or 18 be carrying the load. For this reason it is not necessary to provide a knife edge in the second member, the member having the eccentric groove.

In the event that the lever exhibits a change in ratio when the load is applied sufficiently near the edge of the load receiver to cause the opposite bearing to lift against the stabilizing mechanism the first member may be rotated slightly so that its pivot edge is no longer in vertical alignment with the knife edge of the load pivot, the misalignment being in such a direction that the forces transmitted through the link tend to correct the observed error in ratio.

Various modifications may be made in the details of construction without departing from the spirit and scope of the invention.

Having described the invention, I claim:

1. Stabilizing mechanism for a weighing scale in which a knife edge pivot in a first part cooperates with a V-bearing in a second part for pivotally connecting the parts, in combination, a first member mounted in the first part and having a knife edge substantially aligned with the pivoting axis defined by the pivot and directed oppositely to the pivot, a second member carried in the second part, and a link engaging said members for preventing separation of said parts.

2. Stabilizing mechanism for a weighing scale in which a knife edge pivot in a first part cooperates with a V-bearing in a second part for pivotally connecting the parts, in combination, a first member mounted in the first part and having a knife edge portion that is oppositely directed to the knife edge pivot and that is adjacent to the pivot and is substantially aligned therewith, a second member that has an eccentric portion and that is attached to the second part, and a link engaging the eccentric portion of the second member and the knife edge portion of the first member for preventing separation of said parts.

3. Stabilizing mechanism for a weighing scale in which a knife edge pivot in a first part cooperates with a V-bearing in a second part for pivotally connecting the parts, in combination, a first member that has a generally cylindrical shank that is received in a hole in the first part, the member having a knife edge that is directed oppositely to the pivot and that is substantially aligned with and is adjacent to the pivot, a second member adjustably mounted in the second part and a link engaging the second member and the knife edge of the first member for preventing separation of said parts.

4. Stabilizing mechanism for a weighing scale in which a knife edge pivot in a first part cooperates with a V-bearing in a second part for pivotally connecting the parts, in combination, a first member that has a generally cylindrical shank that is received in a hole in the first part, a non-circular flange on the end of the member having peripheral portions that meet to form at least one pivot edge, said first part having a counterbore at the end of the hole to receive the when flange it is not in use, the hole in said first part being located so that the pivot edge of the flange is in line with the knife edge pivot, a second member that is mounted on the second of said parts, and a link engaging the second member and the pivot edge of the first member for preventing separation of the parts.

5. Stabilizing mechanism for a weighing scale in which a knife edge pivot in a first part cooperates with a V-bearing in a second part for pivotally connecting the parts, in combination, a first member that has a generally cylindrical shank that is received in a hole in the first part, a pivot edge formed on the member and positionable in adjacent alignment with the knife edge pivot, a second member mounted in the second part, a link engaging the second member and the pivot edge of the first member, and a thrust surface on the first member for axially positioning the link.

6. Stabilizing mechanism for a weighing scale in which a knife edge pivot in a first part cooperates with a V-bearing in a second part for pivotally connecting the parts, in combination, a member mounted in the first part, said member presenting a pivot edge that is oppositely directed, adjacent to and substantially aligned with the knife edge pivot, a V-groove in the second part from which the seat for the V-bearing is located, a generally cylindrical member mounted in the V-groove, and a link engaging the cylindrical member and the pivot edge of the first member for preventing separation of the parts.

LAWRENCE S. WILLIAMS.

REFERENCES CITED

The following references are of record in the file of this patent:

UNITED STATES PATENTS

| Number | Name | Date |
|---|---|---|
| 1,685,780 | Hem | Oct. 2, 1928 |
| 1,751,980 | Dean | Mar. 25, 1938 |
| 2,241,349 | Hem | May 6, 1941 |